July 2, 1968  A. E. GREENE  3,390,979
DIRECT STEEL MAKING PROCESS
Filed Jan. 14, 1963
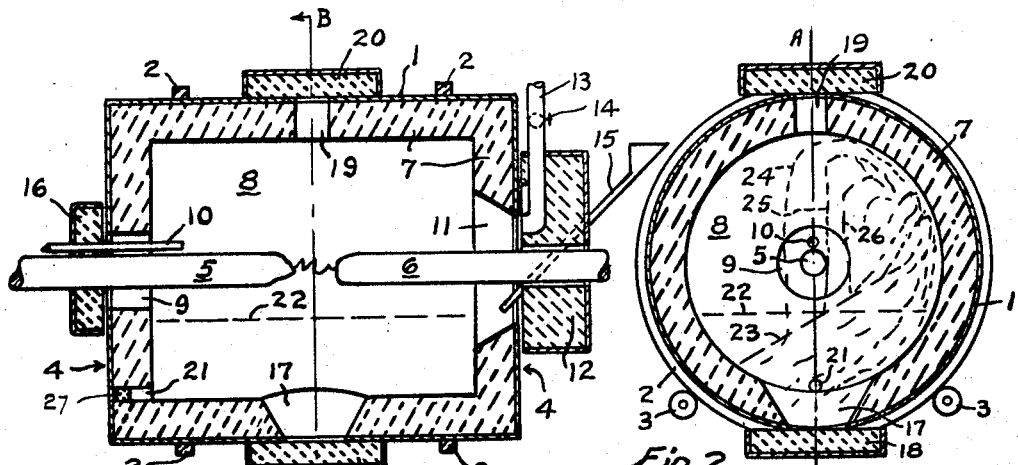
Fig. 1
Fig. 2
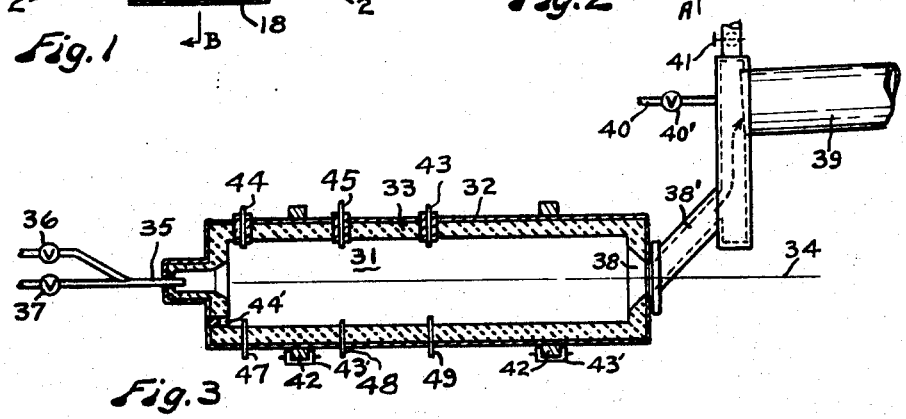
Fig. 3
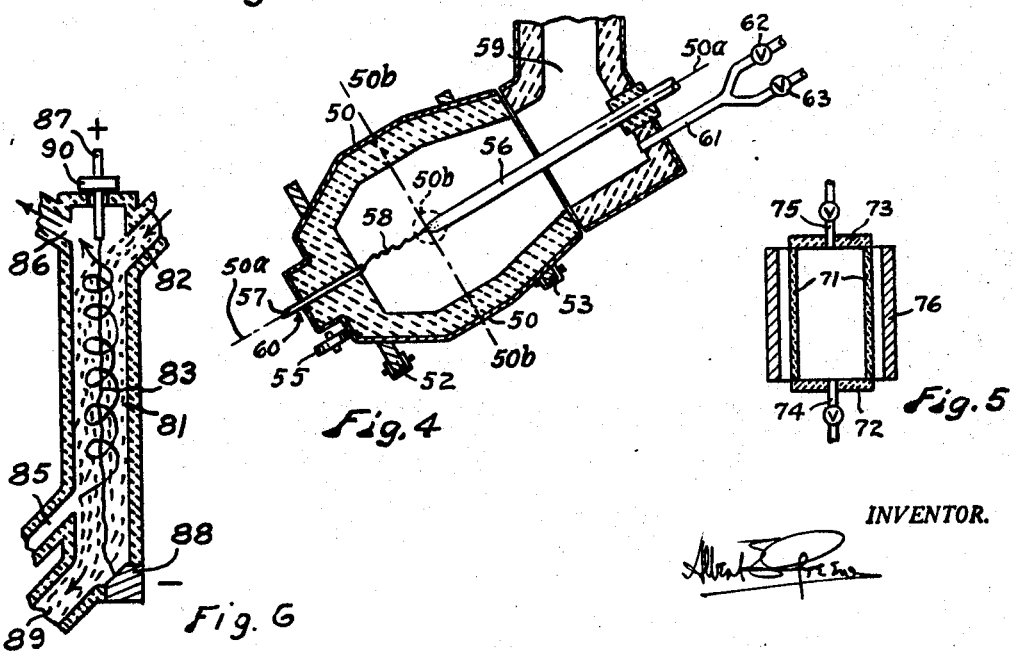
Fig. 4
Fig. 5
Fig. 6
INVENTOR.

3,390,979
DIRECT STEEL MAKING PROCESS
Albert E. Greene, P.O. Box 71,
Medina, Wash. 98039
Continuation-in-part of applications Ser. No. 511,354,
May 26, 1955, and Ser. No. 670,361, July 8, 1957.
This application Jan. 14, 1963, Ser. No. 251,362
17 Claims. (Cl. 75—11)

This application is a continuation-in-part of applications Ser. No. 511,354, filed May 26, 1955, now abandoned, and Ser. No. 670,361, filed July 8, 1957, also abandoned, for which claim for benefit of earlier filing date is made.

This invention relates to the production of metal by direct reduction of ores and concentrates and other ore materials, including sponge iron and slags, for recovery of metal of controlled analysis direct from the ore; and further to the reduction of the metal oxide, iron oxide in particular, in solid state particles at temperatures above those at which the ore particles get sticky and fuse or melt, reducing the metal oxide in the ore particles to solid state metal particles. Thus, the invention reduces metal oxide in ore particles in the solid state at higher temperatures than used heretofore or even thought possible heretofore without melting or smelting. At these higher than sticking or fusion temperatures reduction is faster than in the low temperature, non-fusion processes, and in the final stage of reduction iron oxide in the ore particles reduces and forms solid state metal particles. These solid state metal particles can be discharged in the solid state, or they can be melted before discharge and discharged melted, as the operator chooses and decides.

The invention further relates to the reduction of iron and another metal of the group consisting of Ni, Co, Fe, Mn and Cr; and to the reduction of high grade or low grades ores containing iron.

Control of purity of the reduced solid state metal particles results first, in control of carbonization of the reduced metal particles, and second, in separation of an element oxide or an impurity desired not reduced into the reduced metal. The solid state metal particles can be discharged hot and are not easily reoxidized. Separation of metal from unreduced material can be by well known mechanical or mineral separation means. The elements desired not reduced into the reduced metal particles include phosphorus, titanium, silicon and sulphur; and manganese oxide desired not reduced can be separated as a salt compound.

The general nature of the processes to which this invention relates is given above. The general nature of the presently used or known processes for reducing iron ore which are intended to be improved or replaced by the present invention are set forth herein below; and the serious objections and disadvantages to these and costs are also touched upon.

At present two general methods of reducing iron ore are in use. One is the low temperature, non-fusion reduction process carried out in a combustion heated rotary furnace, using crushed coal, producing sponge iron. The other method is the higher temperature smelting method. Examples of the smelting method are the blast furnace and the Swedish electric pig iron furnace. Both these methods produce molten pig iron. The sponge iron method produces incompletely reduced product. This product contains incompletely reduced iron oxide along with the reduced sponge iron but the product contains the earthy material in the ore and does not separate phosphorus and silicon or titanium to any satisfactory extent. The product contains iron oxide and earthy material which hinder melting in electric arc furnaces because of poor conductivity of the charge. Reduction of up to 50 to 80 percent of the iron content by coal in a rotary, combustion heated furnace is an economical process but must be carried out in low temperature in order to avoid sticking and stoppage of movement by fusion of ore particles together. But such a product is not in demand. Its use as ore material in this invention will be referred to later in this specification.

The smelting furnaces do not have such difficulties as occur in the sponge iron process, but the presence of coke which dissolves in the molten iron and reduction of impurities or element oxides which are dissolved in the molten pig iron, these result in a product which must have the carbon and the phosphorus, etc. taken out in a separate furnace. This process is spoken of as the basic oxygen process and it is fast replacing the openhearth furnace process. The reducing conditions in the blast furnace and in the Swedish electric pig iron furnace cause reduction of oxides of phosphorus, silicon and manganese and these elements are dissolved in the molten pig iron. Sulphur in the ore and coke gets into the molten metal. Titanium oxide in the ore can be reduced and dissolved in the molten metal, but titanium oxide is very refractory and ore containing it is not desirable.

The total heat requirement (B.t.u.) to produce iron by the blast furnace process is very high. This results from making coke for blast furnace use; heating of the air blast; reducing oxides not desired reduced into the molten iron, such as phosphorus, silicon and manganese oxides in the ore; and then in the oxygen conversion furnace the oxidation of carbon which has dissolved in the molten iron in the blast furnace and also the separation of elements or impurities in the molten pig iron results in a heat loss. In the oxygen converter, so much heat results that as much as ¼ ton of steel scrap per ton of molten pig iron can be melted during the "blow," and this is a batch process. The Swedish electric pig iron furnace uses electric heat but must have coke also; and then, the molten pig iron must be converted into steel by oxidation. The apparatus includes much more than the blast furnace proper and material handling into the blast furnace. This includes coke ovens or retorts; hot blast stoves, gas cleaning equipment and pellet making equipment; and the oxygen convertor furnaces make a high total investment cost. Thus the general nature of the presently used processes is indicated above. Reference to the present invention which is intended to improve on and replace present reduction processes follows.

The present invention process reduces iron oxide in solid state to solid state iron particles and agglomerations of these. Since melting need not be used before reduction, the solid state metal can be separated easily. It is not necessary to reduce element oxides or an impurity into the reduced metal. This separation in the solid state is simple avoiding molten refining. The particle treatment makes faster heating and faster reduction possible. The reduced metal can be carbonized as desired. Reduction of a small percentage of the iron present in the charge is important, for example in the treatment of nickel and iron oxide ore, to reduce all of the nickel but a small part of the iron oxide, leaves the unreduced iron oxide for subsequent reduction. The reduced iron can be discharged in the solid state, or it can be melted in the furnace in which it is reduced and discharged melted. The melted metal can be finished to specification before discharge. The melting temperature depends on the extent of carburization, and for a 2% carbon content more or less, melting can be accomplished very quickly after reduction. Example 3 herein shows such treatment.

The heat of reaction in particle size charge is much faster than in any furnace producing liquid metal. The total heat requirement to produce steel direct from iron oxide in an ore material particle is low; and since almost all of an element oxide desired not reduced can be kept from reduction, this source of heat loss is practically avoided. Since no high percent oxygen conversion is needed for separating the high carbon in molten pig iron, because carbonization can be controlled, much heat is saved by this invention. Reactions are fast by this invention; and since batch treatment corresponds in speed to the speed of carbon removal by high percent oxygen, this process of this invention lends itself to tonnage production in a way like a line of rotary ball mills.

The discovery which applicant made is that sticking and fusion temperatures which hindered the sponge iron and fluid bed processes from use of higher temperatures need not cause stoppage in this invention.

The separation of an element oxide, phosphorous oxide for example, combined with lime (CaO) is important yet without melting slag. After the unmelted salt of lime and $P_2O_5$ is formed, it could melt or be melted and the reduced iron could be discharged melted or not melted.

Control of oxidizing and reducing components in gas is in reality control of the oxygen pressure of the gas to maintain a given oxygen pressure, for example, oxygen pressure sufficient for oxidizing iron but not nickel.

An example is the selective reduction of nickel oxide in an iron ore high in iron, using a gas which is reducing to the nickel oxide but not reducing to iron oxide, or not strongly reducing to iron oxide, or which is even oxidizing to metallic iron; holding back reduction of iron beyond what would result from use of a limited amount of solid reducer to reduce the desired amount of iron from the oxide. Here selective reduction of nickel oxide occurs while limiting reduction of iron oxide into the nickel-iron alloy metal particle. Atmosphere not reducing to the phosphorous salt can leave iron oxide in combination with the phosphorus oxide unreduced.

The rotary arc-heated furnace can serve for fast heating and reduction or oxidation simultaneously—that is reducing one oxide and oxidizing a metal. The fast rotation of the rotary chamber causing charge particles to spray out in a stream accomplishes fast hearing and reactions, and permits fast volume treatment. Where the charge particles are subjected to the high temperature arc and arc-heated gas, reducing of the metal oxide can make possible faster reactions at higher power in the arc, much faster than reduction at only slightly above the fusion and sticking range. Other discoveries relate to the proportions of solid reducing materials, particularly for carbon, proportioned for the "$CO_2$-forming reaction" aiding in recovery of low carbon iron or steel direct from the ore.

The basic improvement is the process of treating particle charge at temperatures above that at which the particles of ore material fuse and stick together, accomplishing fast reduction of the metal oxide in the particle to a solid state dense metal particle.

A modification of the above basic improvement involves the essential further limitation which accomplishes the fastest and increased reduction at still higher temperatures, this by use of the electric arc in gas of controlled composition; reducing the metal oxide desired reduced and resulting at these still higher temperatures in more and faster reduction as shown in Example 3 in this specification. These higher temperatures can be as high as or higher than the high temperatures in molten slag smelting as in the blast furnace or in the Swedish molten pig iron furnace; and at still higher temperatures above the melting temperatures of the reduced metal particle as pure iron (2800° F.) or still higher yet, in the very high arc-gas temperatures several hundred degrees Fahrenheit above fusion and sticking temperatures before the iron oxide ore particle has time to melt, and where, if the reduced metal particle is not removed from the high temperature or the effect of that high temperature stopped, the reduced metal particle will melt.

One modification of the basic process of paragraphs 1 and 2 above is use of gas which accomplishes selective reduction, reducing one metal oxide and holding back reduction of another metal or element oxide.

Another modification of paragraphs 1 and 2 above is the use of a "holding oxide" to combine with another oxide to limit reduction.

A modification of the basic improvement and of the process can be carried out in a crucible or retort chamber on loose charge using a solid reducer, heating from the outside instead of by heating by use of the arc and high temperature gas. This modification is not so fast as where the arc is used, because the heat is conducted through the chamber wall and into the charge of loose particles.

The process of this invention can be carried out in different types of furnace apparatus, in particular, two types, based on the method of handling charge. In one type the particle charge mixed with small carbonaceous material for separate, direct particle reduction is charged as a volume or body of mix into a chamber in which the charge is more or less stationary during reduction, except for shrinkage of the product. This modification or type of apparatus is illustrated herein as carried out in a crucible heated from the outside. In a small crucible, as was used by applicant in the tests of this process, fast heating of the charge in the crucible is possible since the source of heat is close to the charge. And although the speed of heating and of reduction is not as fast as for the second type of reduction apparatus described in the next paragraph, this stationary charge method is adaptable in large volume where two dimensions may be large but the third dimension limited to the practical distance for conduction of heat into the charge, as in a coke oven retort.

In the other type of apparatus the prepared charge of small size particles is heated and reduced and the small particles are subjected to heating and reduction in an atmosphere in the final stage particularly which atmosphere is reducing to the iron oxide, reducing FeO to Fe, at the higher temperatures of this invention. The intimate mixture of the separate small particles of iron oxide and solid carbonaceous reducing material in the stationary crucible or retort process accomplishes the separate, direct particle treatment. In the moving charge of the second type apparatus, the separate, direct particle treatment is accomplished by gas which is reducing to FeO, as well as reduction which results from reaction of solid carbon material with the iron oxide.

The product of the crucible applicant called a "slug" from its shape and size after reduction in the small crucible chamber. This product is not what has heretofore been called "sinter" from the sticking-together of iron oxide product starting to fuse; because, in the present invention, the iron oxide is reduced before it can act as it does in ordinary "sinter." Here in this invention the oxide is "gone," that is, reduced before it can stick the charge together. But at the higher temperatures of this invention, after reduction of the iron oxide close to completion, the product may be more or less stuck or fused together into smaller or larger bodies which require crushing for separation of the dense metallic iron particles from unreduced material by mechanical means.

The furnace apparatus of the second general type serves for the treatment, where the separate ore or iron oxide particles are subjected to reduction while in movement and at the higher temperatures in the final stage which permits the dense metal particles to form in the atmosphere which is reducing to FeO. Several modifications of the apparatus of this invention are described in this specification.

In movement of a charge of small particles, either in a rotary chamber, or in a chamber through which the charge falls as a stream, reduction under the reducing conditions of this invention in the final stage of reduction at the higher temperatures, where the particles pass close to or through an electric arc and then drop or move to the lower part of the chamber, the dense metallic iron particles form very rapidly. Particle reduction appears instantaneous, but of course movement of a volume of small particles for reduction in accordance with the present invention.

Several types of apparatus for this invention are shown in the annexed drawings. In these drawings, FIG. 1 is a sectional elevation view of a horizontal electrode rotary arc furnace thru A—A of FIG. 2; and FIG. 2 is another vertical elevation view in section thru B—B of FIG. 1; this rotary arc furnace for carrying out the invention in one or more modifications.

FIG. 3 is a sectional elevation view thru another type of horizontal rotary furnace, for combustion or partial combustion heating of iron oxide material in particle form in movement, for low temperature, non-fusion reduction, for preparing charge for subsequent electric arc heating, and other purposes as described herein; also for showing the difference from the high temperature arc reduction process.

FIG. 4 is an illustration of another type of vessel in which the arc and combustion or partial combustion can be used in accordance with certain modifications of the invention.

FIG. 5 is an illustration of a small stationary chamber for reduction of stationary charge in a modification of this invention, as a batch treatment, but not limited to a chamber as small as a crucible.

FIG. 6 is a diagrammatic sectional elevation view of a long arc type furnace for the heating and reduction of particle charge sprayed out and down as a stream of small particles falling down in and along a long arc in a gas of controlled reducing or reducing and oxidizing properties, shown here against a counter current of the gas; this apparatus for carrying out the invention in certain modifications.

Referring to FIGS. 1 and 2, the rotary arc furnace illustrated has a shell 1, mounted on rolling rings 2 on which the shell rotates on rollers 3. Electrodes 5 and 6 enter thru the shell ends 4. The shell is lined with refractory material, 7, acid or neutral or basic according to the nature of the ore or concentrates and slag, whether basic or acid, where a slag is formed. For a salt to hold phosphorus oxide, which is acid, lime (CaO) as a base combines with $P_2O_5$ (acid), and a basic refractory is used because excess of lime and also magnesia are basic. Space at 9 between the refractory and the electrode 5 permits a pipe 10 to enter for admission of gas into chamber 8. At the other end of the chamber the opening around the electrode is enlarged around the electrode 6. A stationary member 12 is mounted close to the shell and supports an exhaust gase pipe 13 with damper 14. A steel charge chute 15 enters through the stationary member 12 for admission of charge into the chamber 8. A corresponding stationary member 16 is mounted around the electrode 5. These stationary members form seals for entrance of gas or exit of exhaust gas. A discharge opening 17 is shown at the bottom of the shell, closed by a steel-encased refractory member 18. Charge can enter through the opening 17 when the shell is rotated to have this opening at the top. At the top of the shell in its position shown in the drawing an opening 19 is provided in the refractory, closed by another refractory member encased in steel—20. An opening 21 through the end refractory below the electrode 5 serves for discharge of product and is closed by a refractory plug 27 when not needed for discharge, as when the furnace rotates continuously; or for continuous discharge through this end opening when at the lower part of the movement. Dotted line 22 indicates top of charge before rotation starts. The top of the charge is below the electrodes. The dotted line 23 in FIG. 2 indicates a position the charge takes when the furnace is on continuous rotation. The paths of small particles 24, 25, and 26 are indicated when the particles spray out in a stream through and past the arc to the lower part of the chamber for sufficiently fast rotation (r.p.m.).

The FIG. 3 furnace is an elongated rotary furnace rotating on axis 34 with the chamber 31 in refractory material 33 in steel shell 32. Rolling rings permit rotation in rollers 43 by means not shown. Gas enters through nozzle 35 and valves 36 and 37 serve for admission of different gases in desired proportions, such as for adding $CO_2$ to natural gas which is some 90% methane ($CH_4$). Exhaust gasses pass out at 38 through flue 38' into the rotary 39, as is necessary when heating without arc heat and using partial combustion for reducing. Oxygen-containing gas could enter the rotary through pipe 40 and valve 40'. An exhaust for unused gas with damper is at 41. The furnace 32 can be operated as an elongated rotary and rotated either back and forth or continuously. With use of arcs the heavy charge moving up is easily changed in direction—the charge helping to change movement. Using the arcs from electrode 44 to electrode or terminal 47; from electrode 45 to 48 and from electrode 43 to 49, the gas entering through 35 is heated by the arcs. Particle charge could enter along with the gas. The rolling rings are indicated at 43'. The furnace could operate in continuous rotation in one direction.

FIG. 4 is a rotary chamber furnace mounted for rotation on an axis 50a and in a trunnion type support, not shown, to rotate at right angles to axis 50a as indicated for the center line through 50b. This furnace is for combined arc-gas heating of gas reducing to the metal oxide desired reduced, where oxidizing and reducing components enter through pipe 61, the proportions of reducing and oxidizing or neutral gas being adjusted by valves 62 and 63. The arc can be either D.C. or A.C. (direct or alternating current). The furnace shell 50 is lined with refractory. It can rotate on rolling rings 52 and 53 and the slant of axis 50a can be adjusted from horizontal to vertical. A guide roller 55 keeps the shell adjusted. The upper end 59 through which the electrode 56 enters is removable. A bottom terminal or bottom contact is shown at 57 through the refractory and extends to a position 60 below the shell for a sliding contact (not shown) to take current off the revolving shell. The arc is shown at 58, either A.C. or D.C. The electrode 56 is adjustable by an electrode holder not shown to control length of the arc. A nozzle 61 through the hood member 59 is for admission of gas along the arc, with valves 62 and 63 for adjustment of gas components in accordance with the process of this invention.

FIG. 5 is a small crucible type of apparatus for carrying out the invention in small stationary test batches. This FIG. 5 is a sectional elevation view through the center line of the crucible, through its vertical axis. The refractory crucible is shown in section at 71. The crucible can be of magnesia or alumina or silica or other material—Carborundum, as needed. A bottom member is 72, the crucible being a tube. A cover 73 has pipe for outlet of gas 75. A resistor is shown in section at 76 for heating the crucible. This resistor may be of graphite for induction heating or Carborundum for resistance heating and the assembly here shown would ordinarily be mounted in a refractory casing not shown.

The vertical arc chamber of FIG. 6 indicated at 81 has an opening 82 at the upper end for admission of a stream of charge particles which spray out as they fall down to the lower end of the chamber close to and in contact with the hot gas heated by the arc stream 83. This arc is from a top electrode marked 87 and shown as positive where D.C. is used, or anode, and the arc terminates at the lower end on a cathode or negative electrode, 88. The terminals can be reversed, or A.C. can be used. The particle product discharges at 89 and gas enters at 85 and exhausts, that is gaseous products exhaust at 86. The gas can circulate around the arc. Gas could enter at the top and move down with the falling charge particles. The speed of reduction along the arc is referred to further in the specification. Particles entering above fall down and accelerate, unless hindered by the countercurrent of gas from below or unless moved faster by gas entering at the top. In the present invention, the arc provides temperatures up to 5000° F. without any combustion heat from oxygen combining with the reducing gas along the arc. The arc is not a process or an apparatus; it is a source of heating a chamber and has peculiar advantages over a combustion flame in that the combustion flame must pass out of the chamber whereas the arc does not and the arc develops its full temperature when it starts.

The arc in the present invention permits reactions between the gas as reducing agent and the iron oxide being reduced by the gas, without necessity of reforming a gas, natural gas particularly, before using natural gas. Reforming natural gas causes very considerable loss of heat when the carbon is oxidized to CO. For reduction of FeO to Fe, a $CO \cdot CO_2$ gas in which the ratio of CO to $CO_2$ is 1.5 to 1 (one and one-half to one) can serve as reducing agent. A $CO/CO_2$ gas of less than 1 can reduce nickel oxide without reducing iron oxide as FeO.

Certain hydrocarbon gases, including methane which is $CH_4$ and acetylene, which is $C_2H_2$ can be used advantageously, and without any reforming. Cases usable in this invention include CO, $H_2$, and combinations of CO and $CO_2$ and $H_2$ and $H_2O$. Straight hydrogen is a strong reducing agent as gas. Reaction between a hydro-carbon gas at the arc temperature and iron oxides is very fast. The indication of speed is the reduction of an iron oxide particle during movement through or along an arc, as during the time this oxide particle falls along an arc.

Sponge iron has been mentioned as "ore material"; and if made in a combustion-heated rotary furnace and discharged hot, at temperature close to the maximum without sticking or fusion, into a rotary horizontal arc furnace, the heating to temperature above fusion and sticking results in increased reduction especially at temperature of 2400° F. or higher. The already reduced sponge iron in small particles lowers the resistance across the arc along with reduction of small particles in the arc-heated gas and necessitates lengthening the arc to limit current. This lowering of resistance between arc terminals accomplishes much faster reduction at temperatures above the sticking and fusion of particles. This "lengthening" of the arc is indicated in certain examples. In the record of Example 2, at 7:15 p.m., it states: "current off; long arc at break" and in this same example, at 7:23 p.m., "long arc (arc pulls out as temperature increases)." Such expressions are explained in reference to the increased reduction due apparently to the reduced metal particles. If a sponge iron furnace is producing sponge iron, which may be only 70% reduced, the unreduced product will contain 30% of total iron content as iron oxide. This product can be reduced to about 97% of the unreduced iron by admitting the hot product of the sponge process into a furnace of this invention, rotary arc or one of the other apparatus types, and be reduced very quickly. Compared to what the Kichline patent says must be done, namely smelting, the present invention is far more efficient. But then, the raw ore of Kichline should be treated by the process of the present invention, for the raw ore is very much like the raw ore from the Cle Elum nickel-iron oxide ore.

EXAMPLE 1

This is an example of the reduction of high phosphorus iron ore in a rotary arc furnace like the furnace shown in FIGS. 1 and 2. The shell of this furnace was about 30" in diameter and 30" long. It was lined with alumina neutral brick and the inside diameter inside the lining was about 20" and length the same. The furnace was heated by an arc and was used in this heat by rocking back and forth, in order to expose the separate particles of the charge directly to the heat of the arc. The ore used was a limonite ore, Sample No. 3534, from Columbia County, Oregon. The analysis of the wet ore as taken from the pit was reported as containing 47.0% iron and 0.37% phosphorus. It contained about 11% combined water and silica and alumina. With the water removed it contained about 56% Fe.

The charge mix for this heat consisted of 11 lbs. of the ore mixed with 2.75 lbs. of lime and about that much creosote carbon. More carbon was charged in on top of the ore charge as the heating proceeded, this in order to maintain reducing conditions but without limiting the carbon content. This charge mix was charged into the furnace. The furnace was hot from the next previous heat. The current was kept on while the furnace was rocked back and forth, but use of the arc was intermittent in order to not fuse the ore before reduction. Samples were taken from time to time to determine the extent of reduction. This was done by stopping the arc heating and rolling the furnace over so that charge came out thru the top hole. A total of about 4 lbs. of crushed carbon was used. This heat was kept in the furnace for more than one hour. When the last sample had been taken the remaining product was emptied into an iron pan. The reduced metal was mostly in the form of small pellets. Some unreduced material was melted forming slag. This may have aided in causing agglomeration of the iron pellets.

RECORD OF HEAT #139 AS EXAMPLE 1

Purpose of Heat: To recover solid state high carbon iron; using solid crushed carbon as reducer and to maintain reducing conditions; no gas put through furnace.
Furnace: Rotary-arc type. Reducing material creosote carbon (like petroleum coke).
Charge mix: Particle size

| | (lbs.) |
|---|---|
| Ore | 11 |
| Lime | 2.75 |
| Carbon | 2.75 |

Additional crushed carbon used to maintain reducing conditions. Total carbon used about 4 lbs.

Analysis of ore: Iron 47.0%, phosphorus 0.37%, combined water about 11%. Product: Solid state particles and pellets.
Recovery: About 4 lbs. pellets; more iron pellets not separated from unreduced material or slag.
Analysis of metal: Carbon 3.02% and 3.27%.
Unreduced product:

| | Percent |
|---|---|
| Silica ($SiO_2$) | 38.1 |
| CaO (Lime) | 26.48 |
| Magnesia (MgO) | 2.07 |
| Unreduced iron (FeO) | 1.4 |

This heat was made to shown carbonization of the reduced, solid state metal particles and pellets. Phosphorus to iron ratio—about 0.79%. This heat was to show reducing conditions without use of gas. The heat was in the furnace for more than 2 hours, which caused much oxidation of carbon. Comparison with the heat of Example 2, also without gas, using solid crushed carbon on top of charge in the same type of rotary-arc furnace, made steel with 1.4% carbon.

EXAMPLE 2

This example of the process of this invention shows the direct reduction of iron ore to steel in the rotary arc type furnace like that used for the heat of Example 1. This heat was made on iron oxide ore which contained a small percentage of nickel. The ore came from North of Blewett Pass on Nigger Creek, in Washington State. This ore contained a reported 58.9% of iron and 1.23% of nickel. The charge for this heat consisted of about 10 lbs. of the ore of about 10 mesh mixed with ¾ lb. of creosote carbon. This charge was put in the furnace shortly after the previous heat had been discharged.

Time, p.m.:     Data and notes
6:36 _____ Charge in hot furnace.
6:39 _____ Current on thru the arc.
6:45 _____ Much gas coming off.
6:50 _____ Door at top of shell opened to inspect. Hot gas comes out; charge sticking to lining; the lining for this heat was acid or neutral; iron oxide reacts quickly with silica. Decided to add more carbon and after reduction to melt the reduced metal.
7:00 _____ Added 1¾ lbs. creosote carbon, making total of about 2½ lbs.
7:10 _____ Arc on.
7:13 _____ Flame out of top opening in cover; 24" high.

| Time, p.m.: | Data and notes |
|---|---|
| 7:15 | Current off; long arc at break; charge next to lining colder; |
| 7:20 | Arc on again. |
| 7:23 | Long arc (arc pulls out as temperature increases). Rocking; long flame; steel sparks. |
| 7:28 | Propane gas makes much "soot." Took second sample; 24″ flame. |
| 7:30 | Rocking. |
| 7:32 | Less flame (indicating reduction completing). |
| 7:34 | Arc current off; had melted the reduced metal. |
| 7:36 | Tapped metal into sand in pan. |

(Time: 30 minutes from start of gassing, until metal reduced, and then melted and then tapped.)

The added carbon rolled around on top of the charge. The weight of the metal—steel—reduced direct from this ore was more than 70% of the iron content of the ore charged. That is, more than 4 lbs. of steel was poured and weighed up, and pellets, not weighed, were left with the slag or unreduced material. Some reduction took place at low temperature while the arc was off part of the time.

The metal tapped from this heat was later melted in a crucible and poured into 4 small ingots. Drillings were taken and analysed. The analysis of the metal in these ingots was as follows:

| | Percent |
|---|---|
| Carbon | 1.40 |
| Nickel | 1.14 |
| Phosphorus | 0.086 |
| Chromium | 0.18 |

As experience with this equipment and process was had, it was found that low temperature-non-fusion reduction takes place readily to more than 50% of the total iron content of the ore. Then, at higher temperature, the final reduction of the FeO was accomplished in much less time; so that for finishing a heat and reducing close to all the iron, less than 10 minutes of time was required under higher temperature non-fusion reduction conditions. This, in Example No. 3, is referred to later in this specification, for another direct reduction heat where the ore or oxide particles containing FeO were subjected to reduction close to the arc in a reducing atmosphere.

EXAMPLE 3

This heat was made in the rotary arc furnace like that of FIGS. 1 and 2. It was made on a soft, limonite iron ore, high in phosphorus and also high in both combined water and in moisture. The ore as taken from the ground analyzed about 45% iron and 0.37% phosphorus. After removal of the water the iron content was about 56%, and silica and alumina and manganese were present. The sulphur of this ore is usually about 0.25%, but the sulphur in the creosote carbon used is usually much higher.

This heat was made in a lining of chrome-magnesia brick, a basic material. Heats in this furnace were usually on charges of from 10 to 20 lbs. of ore, plus other ingredients. In this heat the charge was as follows:

| | Parts |
|---|---|
| Ore, crushed to under 10 mesh (10 lbs.) | 100 |
| Carbon, small—about same as ore (1 lb.) | 10 |
| Lime (burnt)—CaO (2 lbs.) | 20 |
| Magnesia (MgO) thru 20 mesh (1 lb.) | 10 |

The lime was to hold the phosphorus as oxide along with iron oxide as a salt (unfused), while reducing the iron oxide to dense metallic iron particles and pellets. Some, in fact a considerable part of the reduced iron was melted during the last high temperature heating with the arc, then discharged molten, and then solidified. The MgO was purposely added to give the unreduced material a higher melting temperature than that at which the ore particles become sticky or fuse, which last temperature is not much over 1700 deg. F., if that high.

The charge was admitted as a batch into the rotary arc furnace. Preheating and partial reduction took place here below the fusion or sticky temperature of this ore in the Heat #295 of this Example 3. From a sample of the partly reduced charge of this heat, analysis showed that the charge had been partly reduced and contained about 30% of iron as oxide, thus having been reduced to about half of its original content of iron, and contained small metallic iron particles.

The record of Heat #295—as Example 3

| Time, p.m.: | Notes and data |
|---|---|
| 1:05 | Arc on. |
| 1:07 | Charge in. |
| 1:30 | Started use of gas (from gas producer; Eddy ran producer). |
| 1:46 | Started gas into furnace; furnace not hot; no fusion. |
| 2:00 | Gas less after arc off; increases when arc on. |
| 2:15 | Discharged unreduced product material for sample; sample # '57–3/30; sample analyzed 30% Fe. |
| 2:20 | Arc on; not hot enough. |
| 2:23 | Amps, 1000. |
| 2:24 | Arc off to change to higher voltage from 95 volts—(from) secondary transformer to electrodes. |
| 2:25 | Did not change reactance. |
| 2:35 | No load voltage on electrodes without arc— now 130 volts. |
| 2:37 | Arc on; amps goes to 2700 when arc first on; then holds at 1750 amps, and voltage between electrodes—100 volts. |
| 2:45 | Arc off to tap (discharge product) into pan. Some pellets melted; one large piece bent before it broke. |

In this Heat #295, after the sample had been taken showing that partial reduction of the iron oxide had taken place but the temperature was not high enough, with 1000 amps of current at 95 volts from the secondary transformer; the power was cut off to change to higher voltage. The reactor connections were not changed; but the voltage, no load, that is, before starting the arc, was 130 volts. Then at 2:35 p.m. the arc heating was started; the currents increased to 2700 amps when the arc went on, then held to 1750 amps through the arc; and the voltage across the arc, that is, between electrodes, was 100 volts. This increased the power in the arc to almost double what it had been, especially since the current and voltage in the arc are about in phase. Reducing gas was used, and since partial reduction at below fusion temperature had taken place, then higher temperature reduction at higher power took place, and the particles of metal or ions, or whatever they were, caused much less resistance and consequently higher current through the arc. Pulling the movable electrode out, thereby increasing the resistance between electrodes, was necessary to hold the current within limits. In only about 8 minutes partically all of the remaining iron oxide was reduced, and in addition a large portion—almost ¾—of the reduced iron was carbonized and melted, and the reduced iron was melted into a molten metal bath and discharged melted. The weight of two larger pieces of this metal is nearly 3 lbs., and several pieces have been given away and small particles of metal were discharged along with the unreduced material. The total metal in the 10 lbs. of charge was, at 45% iron content, only about 4.5 lbs. As result of the much increased power in the arc-heated gas the reduced metal particles are reduced very rapidly, and it was necessary to move the movable electrode out to limit the current.

At the higher temperatures which are much above the fusion and sticking temperatures of the ore material, the solid reduced metal particles form very rapidly in the arc-heated reducing gas in the rotary arc furnace, and especially where the temperature was high enough, as it was in this heat, to melt the reduced metal.

During the first part of heating, no reducing gas was passed into and through the furnace chamber. After the charge was heated to above 1500° F. reduction took place without fusion from solid carbonaceous reducing material in the charge, and small particles of metallic iron were formed. Gas reducing to FeO was passed into and through the furnace during the part of the heat at the higher temperature and served to reduced or be reducing to the metal oxide desired reduced, and also to take the products of the reduction of the iron oxide out of the chamber. This gas also kept air out of the chamber. It contained enough CO in proportion to $CO_2$ to be reducing to the FeO in the final stage of reduction to metallic iron; or to reduce nickel oxide desired reduced. This heat of Example 3 was carried out in the rotary arc furnace using the back and forth movement of the charge. A small opening through the refractory permitted the gas which entered through the small pipe at the side of the electrode to get out of the chamber. A small amount of gas serves to control the atmosphere and to aid in removing the products of reduction of FeO and other metal oxide being reduced. The CO-containing gas was made in a small gas producer using small coke, about ½″ size and high percent oxygen. Practically no nitrogen or air entered the furnace chamber during the high temperature, last stage of reduction to the dense, solid state metal particles.

Right after the sample was taken the power in the arc was increased in the reducing gas, and after reduction at the higher temperature which was high enough to melt the reduced metal, and with the reducing gas passing through the furnace, then after a bath of molten metal had formed the melted metal and other product was discharged in about 8 minutes from the time the power was increased.

One of the larger pieces of the reduced metal after it was discharged and had solidified and was cold bent before fracture. The slag, some of which had melted, was analyzed and contained only about 3.7% of iron including metallic iron particles and unreduced material.

The analysis of the metal was: carbon 2.6%; silicon 0.20%; sulphur 0.01%; phosphorus 0.18%; and manganese 0.14%.

Moisture and combined water can be removed prior to the higher temperature heating in the rotary arc-heated furnace. The speed of heating and of water removal can be accomplished very rapidly in this type of furnace where the small, separate particles of charge are subjected to the high temperature while in movement in the gas close to the arc, and particularly in the method of operation where the speed of rotation of the chamber is high enough to cause the particles to spray out in a stream in the gas heated to high temperature by the arc, whereby fast heating as well as reaction takes place.

EXAMPLE 4.—HEATS #78 AND #76

This example of this process and modification of this invention shows the reduction of iron oxide direct from ore material high in phosphorous, a concentrate in Heat #78, and shows the use of an element oxide spoken of in this application as a "holding oxide" combined with the phosphorus oxide (assumed as $P_2O_5$), forming a salt but without melting the salt, that is, without forming slag in this example.

Example 1 in this application shows the direct reduction of a limonite iron ore high in phosphorus under strong reducing conditions, using excess solid crushed carbonaceous material to maintain reducing conditions during the heat and recovering metallic iron particles and pellets high in phosphorus and also in carbon. Fast reduction of iron oxide in the ore material took place and the temperature was high enough to permit melting some slag formation. This may have assisted in agglomerating some of the metal particles. The original record mentions that some slag was formed. This heat from about 2:56 p.m. until 5:10 p.m., or more than two hours, during which the arc was off often and the furnace opened several times to examine what was taking place and to take samples. At 4:10 p.m. the record says "arc current off; poured loose product into pans; some molten slag came." At 5:00 p.m. the record says: "Arc on and rolling 1500 amps; quite hot—long arc" and at 5:04 "Pouring—some molten flowed out along with solid particles," and "5:10 All poured out; some molten."

Example 2 (Heat #233) shows direct reduction of a fairly pure iron ore, also fast, but with limited carbonization, for the carbon added on top of the charge to maintain reducing conditions during the heat did not prevent having the carbon in the metal as finished in the steel-carbon range. The carbon in the reduced metal particles after melting these and pouring the melted metal into small ingots was only 1.4%.

The record of this Heat #233 mentions at 7:15 p.m. "long arc at break," and again at 7:23 p.m. says "long arc" etc., and at 7:36 p.m. says "Tapped out into sand in pan," and the note immediately following after 7:36 p.m. says: "Time about 30 min. from start of gassing to 7:05 p.m.; poured metal and slag."

Example 3 (Heat #295) shows the advantage of further control of reduction of impurities or element oxides desired not reduced into the steel or metal, holding back reduction of phosphorus oxide in the salt formed; and likewise held silica from reduction into the reduced solid state metal particles; and the analysis of one of the large pieces of metal which was tapped, molten into pan and drilled for sample for analysis, showed: carbon, 2.6%; silicon, 0.20%; sulphur, 0.01%; phosphorus 0.18%; and a later analysis reported manganese 0.14%. Sulphur as sulphide is oxidized while iron oxide is reduced or partly reduced and separated. Phosphorus oxide is spoken of as an acid oxide and the basic oxide, CaO, holds it in the salt against reduction of iron oxide, along with some iron oxide. The CaO acted in similar manner to combine with the silica and hold it against reduction. In Heat #78 of Example 4, the solid carbon reducing material was insufficient to reduce all of the iron oxide or FeO, and some unreduced iron oxide was left in the product. The process of this invention permits and can accomplish partial reduction of iron oxide to metal where the ore material has more iron as oxide than is desired reduced to metal, for example to hold back reduction of iron oxide while reducing nickel oxide to metallic alloy iron.

Example 4

This example of the process of this invention in one modification shows the reduction of iron oxide direct from a high phosphorus-containing iron oxide ore material, a concentrate in Heat #78; using a "holding oxide" to combine with the phosphorus oxide as a salt, without necessarily melting the salt and forming slag. This example shows recovery of a still lower phosphorus content in the reduced solid state metal particles than in Heat #295 of Example 3 by use of a basic holding oxide CaO without slag formation and without melting the reduced iron particles into a molten metal bath. In smelting furnaces like the blast furnace and the Swedish molten pig iron furnace impurities in the ore are reduced in the molten slag and are then dissolved in the molten pig iron. A similar result occurs when manganese and iron containing ore is reduced in electric arc furnaces. The ore material in this Heat #78 of Example 4 contained a reported 57.0% of iron and 0.68% of phosphorus. The phosphorus here is more than 1% of the total iron and phosphorus, and would have been that had all of both these elements been reduced to metal. In this Example 4 a small magnesia crucible was used, having an inside diameter of between 1 and 2 inches and height inside of 3 to 4 inches, holding up to about 200 grams of charge. This magnesia crucible was heated inside a graphite tubular resistor, heated electrically as a resistor. The recorded information on this heat is as follows:

The charge mix was made up as follows:

| | Grams |
|---|---|
| Iron oxide concentrates | 100 |
| Lime | 14 |
| Carbon (fine) | 7 |

Time, p.m.:     Data and notes
- 4:06 ____ Charge in crucible.
- 4:09 ____ "Gassing" (evolution of gas starting).
- 4:15 ____ Gas continuing to come off.
- 4:31 ____ Temperature estimated over 2000° F.
- 4:40 ____ Gas stopping.
  - The reduced metal had almost melted into a button.
  - Time after start of gassing: 33 minutes.

Another heat, #76 here, like the above heat on high phosphorus concentrates was made, this on high phosphorus limonite ore which contained about 45% iron and 0.60% phosphorus. The reduced dense metal particles and pellets after separation from the unreduced material were put together and melted in a crucible. The melted iron was then poured into a mold and cooled and then drilled for analysis. This recovered metal was low in carbon and analysis showed the phosphorus was 0.028%. Had all of the iron and all of the phosphorus in these ores and concentrates been melted together after being reduced, the phosphorus would have been over 1%. The pellets and dense metal particles were easily separated by magnet from the remaining unreduced material containing the phosphorus oxide combined with lime but not melted as slag. The atmosphere and other reducing conditions at the lower temperatures than in a bath of molten steel and basic slag to remove the phosphorus give an important advantage to the process of this invention.

In Example 3 the holding oxide served to hold back reduction of the silicon from the ore into the dense metal particles formed and also to separate sulphur. Lowering of the phosphorus content in the higher carbon metal of Example 3 was possible and could be further lessened in the recovered iron. Thus limited proportion of carbon along with atmosphere control and temperature control make possible the advantage of this invention in its different modifications. Other examples follow.

EXAMPLE 5.—HEAT #124

This test heat was made on an iron ore high in manganese with the object of recovering the iron and separate practically all of the manganese. There are large deposits of this kind of "high-manganese iron ore" in some of the Northern United States. Reduction in the blast furnace would produce a "spiegel iron" and the manganese is not easily reduced without too much iron being reduced along with the manganese. The particular ore used in this heat test analysed: iron 28.05%; manganese 13.45%; silica 32.8%. This high silica would make the use of this ore very disadvantageous. The record of this heat follows.

Charge mix:

| | Grams |
|---|---|
| Ore through 6 mesh | 50 |
| Silica flour | 15 |
| Creosote carbon | 4 |

Time, p.m.:     Notes and data
- 5:40 ____ This charge was put in a silica crucible. Heating of charge was through the crucible wall inside a graphite tube or crucible which served as the resistor. The purpose here was to reduce the iron oxide but leave the manganese oxide combined with silica.
- 5:43 ____ Gas coming off.
- 5:52 ____ Second charge, same mix as the first 50 grams of charge was put in the crucible, on top of the first charge.
- 6:10 ____ Crucible taken out of furnace and cooled. Time: 27 minutes. Analysis of pellets: manganese 0.05%; iron 96.1%.

This example shows the use of silica as a holding oxide to hold the manganese oxide from reduction while reducing the iron oxide. A similar use of silica as a holding oxide, without forming slag, was used in a treatment of high phosphorous manganese and iron ore, reducing the iron and the phosphorus into the reduced iron and along with it, leaving the manganese as a manganese silicate and separating it.

Larger heats on practically all of the ores used in the testing of this invention were made in the large rotary arc furnace, using both basic (Magnesia) and acid (silica) linings, according to the treatment used.

EXAMPLE 6.—HEAT #24

This example of the process of this invention in one modification in this heat test was on a high silica manganese ore of the following approximate analysis: Mn 38.6%; Fe 2.55%; silica 22.16%; and CaO 5.48%. The charge mix for this heat was as follows:

| | Oz. |
|---|---|
| Mn ore | 4 |
| CaO (lime) | ½ |
| Carbon (creosote carbon) | 1 |

This test was made in a basic (Magnesis) crucible, heated in a graphite crucible or tube, surrounding the magnesia crucible.

Time, a.m.:     Notes and data
- 11:15 ____ Crucible in furnace; cover on; 10 k.w.
- 11:24 ____ 14 k.w.
- 11:30 ____ Cut power of; charge shrinks way down, to half or below.
- 11:35 ____ Temp. 1100° C. (2100° F.).
- 11:45 ____ Filled the crucible up again with first batch still in it.
- 11:50 ____ Gas coming off; 10 k.w.
- 11:55 ____ Holding temp. down; lower power; (had left last batch in bottom of crucible).

Time, noon:
- 12:00 ____ Cut k.w. to 5; temp. 1050° C. inside on charge; 1350° C. outside of crucible. Charge sinking down.

Time, p.m.:
- 12:03 ____ Put more charge in, filling crucible to top.
- 12:05 ____ Current on.
- 12:20 ____ Put balance of 8 oz. of charge in crucible.
- 12:22 ____ Temp. inside 1300° C. (2730° F.) power off.
  - After power off, took product of the crucible out, and after cool put in paper bag.

Later analysed the pellets for manganese; found Mn 82%. It will be noted that the ore had about 5% CaO, and this in addition to the CaO in the charge mix totalled about 17.5%. The silica reported as 22% later was reported as about 18% and included alumina in the higher figure of 22.16%. This ore was rejected by the Government for the stock pile in the last war. After reduction of the manganese and iron, the remaining unreduced material contained the silica and lime and also some unreduced manganese. This example shows the use of lime as a holding oxide to combine with the silica and permit reduction of the manganese and iron, yet without formation of slag. The manganese separated in the previous Example 5, as combined with silica, could be recovered as in this Example 6.

EXAMPLE 7.—HEAT #302

This heat was made on nickel and iron oxide ore from Oregon. The analysis of this ore was as follows:

| | Percent |
|---|---|
| Nickel (Ni) | 1.53 |
| Iron (Fe) | 10.00 |
| Silica ($SiO_2$) | 50.3 |
| Alumina ($Al_2O_3$) | 2.5 |
| Magnesia (MgO) | 25.8 |

Notes and data

Charge mix for this heat:

| | | |
|---|---|---|
| Ore (particle size) | lbs | 10 |
| Creosote carbon | oz | ½ |

The furnace used for this heat was the rotary arc furnace used in other heats; and had a basic lining. The ore of the charge mix was smaller than 10 mesh. This heat was made with the shell rocking in back and forth movement, with small opening at the top for exit of gas. Gas was made in a small gas producer using small coke, about ½" size and high percent oxygen. The gas producer was started by use of acetylene and oxygen from a standard torch, to heat the coke bed. The depth of bed was regulated by keeping the top of the bed at desired level for a $CO/CO_2$ gas having sufficient $CO_2$ to oxidize iron. The record of this heat follows:

Time, p.m.:     Notes and data
2:24 ---- Charge mix in rotary arc furnace.
2:50 ---- Furnace rolling back and forth and charge rolling.
           The arc was on meantime and there was some sticking together of the particles.
2:52 ---- Took sample #1 in pan; this was done by cutting off the power and the arc and rotating the furnace until a small amount of product was discharged into a pan beneath. This sampling during the heat was to check product and reduction.
2:53 ---- The ground conductor to one electrode burned off.
3:25 ---- The arc was started again after replacing the connection.
3:30 ---- Charge rolling.
3:32 ---- Sample #2 taken in pan. Chunks of stuck-together product had begun to form, indicating a temperature above 2500° F. It was decided to melt the refractory material.
3:38 ---- Arc on to melt the unreduced material, and sample #3 was taken.
3:47 ---- Arc too long to break except by cutting off power. This was done.
3:50 ---- Discharged the product into a pan. Took sample #4. After cooling, pellets from the product were taken for analysis. The nickel in the ferro-nickel (nickel-iron) was 54.6%.

EXAMPLE 8.—HEAT #245

This is an example of volume treatment of a nickel and iron oxide ore containing about 1% nickel and 10% iron, the remaining material consisting of magnesia and solica, to recover high nickel-content nickel-iron alloy compared to the nickel to iron proportion in the ore. With all of the nickel and all of the iron reduced to metal, the nickel would be about 9.1% of the total metal. This heat was made in a rotary arc type furnace of a small commercial type, and the shell rotation was back and forth, causing movement of the charge particles and subjecting them to the heat of the arc while passing gas into and through the chamber to maintain an atmosphere reducing to nickel oxide but not to FeO. The special producer gas was made in a small gas producer, using crushed coke, about ½" size, and high percent oxygen. The coke bed was heated by acetylene gas and oxygen. Then the gas was cut off and oxygen alone used. The depth of bed was regulated to produce a CO and $CO_2$ so that the gas would not burn regularly when lighted from the top of the gas producer through a small valve. The $CO_2$ was usually sufficient to put the flame of a lighted paper out.

The charge for this heat was made up as follows:

| | | |
|---|---|---|
| Cle Elum iron-nickel ore through 10 mesh | lbs | 10 |
| Creosote carbon (petroleum coke-through 10 mesh) | oz | ¼ |

Time, p.m.:     Data and notes during heat
5:15 ---- The above charge was in furnace.
5:20 ---- Gas from the producer was passing through the furnace. Heating of the charge was by the arc while the furnace rocked back and forth.
5:43 ---- Took sample. No fusion of charge particles had taken place.
6:00 ---- Took sample in pan—about 8 oz.
6:11 ---- Decided to increase power, and did.
6:15 ---- Much gas comes off and much hotter.
6:17 ---- Put steel bar through top opening into chamber.
           Found a little slag had melted as indicated on end of bar.
6:21 ---- Current through the arc cut off; gas still on.
6:23 ---- Discharged the contents of the chamber into a pan by rotating the shell around; this was very hot, estimated at least about 2400° F. Later, when cold the product was crushed through rolls and metal pulled out by magnet.
           Analysis of this metal: 51.4% nickel.

This heat will be further referred to later in the specification.

EXAMPLE 9.—HEAT #266

This heat was made on a high iron-content nickel and iron oxide ore. It was made in the same rotary-arc type furnace used in other examples. The rotary furnace for this heat was lined with basic magnesia brick. The ore used was in the form of concentrates which had been ground much finer than the ore previously used; about half of the charge of ore was through 300 mesh and the balance quite fine.

The analysis of the ore for this heat follows:

| | Percent |
|---|---|
| Nickel | 1.53 |
| Iron | 29.01 |
| MgO | 8.33 |
| $Al_2O_3$ | 8.50 |
| Silica | 20.68 |

The charge mix for this heat was as follows:

| | | |
|---|---|---|
| Ore | lbs | 9.5 |
| Creosote carbon (fine) | oz | ½ |

The amount of carbon was sufficient to reduce all of the nickel oxide. Gas made in the small gas producer used in other heats was used throughout this heat; blown in through the small pipe near the electrode at one end and burning out the hole in the top part of the furnace. Rotation was back and forth. The heating was by the arc. The gas was made using small coke and high percent oxygen. The gas was about half $CO_2$ and balance CO. Product samples were taken during the heat; two before the charge began to get stuck and two after that, for after the nickel was believed largely reduced, it was decided to increase the temperature. After this was done the product was discharged and there was a good deal of dark-black slag. After cooling the pellets stand out as shiny metal-nickel plated in appearance against the black high iron oxide slag. The pellets were easily separated. Analysis of these pellets showed 41.5% nickel in the nickel-iron alloy metal.

In another heat on the ore used in Example 8 the pellets analyzed 67% and 70% nickel. The gas apparently reduced the nickel but not iron oxide.

EXAMPLE 10.—HEAT #277

This heat test was made on concentrates from beach sand. The purpose was to reduce the iron oxide but hold back reduction of titanium oxide, and recover iron suitably low in titanium so that it could be used as melting stock for melting in electric steel melting furnaces. The analysis of the concentrates used in this heat is as follows:

| | Percent |
|---|---|
| Iron in concentrates | 62.2 |
| $TiO_2$ in concentrates (about 6% Ti) | 8.25 |

The charge for this heat was as follows:

| | Grams |
|---|---|
| Ore (concentrates) | 100 |
| Lime (CaO) | 11.5 |
| Cresosote carbon | 7.5 |

Time p.m.: Notes and data
- 1:38____ Charge in crucible (Magnesia crucible).
- 1:48____ Temp. 2000° F.
- 1:53____ Gas coming off.
- 2:00____ Temp. 2500° F.
- 2:13____ Charge going down; forming "slug."
- 2:23____ Small pellet sample—pounded flat without fracture; indicating low carbon and low phosphorus.
- 2:30____ Current shut off; pushed the unmelted ilmenite-containing unreduced material aside and could see the mirror-like metal surface.
- 2:33____ Crucible removed from furnace. After cold the metal button was weighed at 40 grams and then drilled for sample for analysis. The drillings from this sample analysed 0.05% Ti.

In another heat on beach sand concentrates without lime and with excess carbon for reduction, the metal contained 0.36% Ti (Heat #271). Use of lime to combine with the titanium oxide and with only a limited proportion of carbon reducing agent, insufficient to combine with all the oxygen of the iron permits low titanium in the reduced low carbon metal.

Another heat (Heat #280) was made using 10 lbs. of the 62% Fe-concentrates, with 1 lb. of lime and ¾ lb. of carbon. It was found that the last part of the iron content does not reduce until higher temperature is used.

EXAMPLE 11.—HEAT #155

This example is the reduction of iron and manganese in a sample of basic openhearth furnace slag. This sample analysed 20.1% iron, 5% Mn. The balance was made up of alumina, magnesia, lime, and a small amount of silica. The iron oxide for 20% iron as FeO would be nearly 30%. The charge for this test was prepared by crushing the slag to about 20 mesh and mixed with lime and fine carbon; using 100 grams of the crushed slag; 15 grams of lime and 10 grams of carbon. This test was carried out in a magnesia crucible about 1½" inside diameter and 3" high inside. The crucible was heated in a furnace inside a graphite resistor and the graphite resistor inside refractory material.

In the specification "sponge iron" is included in the ore materials. Sponge iron includes reduced metallic iron. It also includes iron oxide, more or less reduced to the FeO stage. The use of sponge iron as "ore material" actually includes a high percentage of reduced metallic iron as small particles. When sponge iron is admitted, hot, into a furnace of this invention, either a crucible or retort furnace, or a rotary arc type furnace, it is only necessary to reduce the unreduced iron oxide which enters. Since in earlier work of this applicant it was found possible to carry out a process involving melting or smelting, with as little energy consumption as about 1100 kwh. per ton of melted and reduced iron, the energy consumption to finish reduction of much less than 50% of the total iron will be much less than 1000 kwh. per ton of total iron recovered as metal by this invention, especially when it is not necessary to melt or smelt and where practically very small percentages of impurities remain in the reduced metal product.

Control of analysis, by this invention, permits recovery of high carbon iron for use in cupolas, which differs much from pig iron, even without scrap. The metal of Example 3 shows a new product.

Applicant found that results which he obtained in a crucible by the process of this invention were easier to get in the larger rotary arc furnaces which he has used, a type which can be enlarged for tonnage use yet having the speed now known possible by the basic oxygen process.

Solid state metal is much simpler to separate than to refine melted. The solid state metal can be melted before discharge without impurities reentering it.

The process of this invention carried out in a crucible saves much time waiting for an analysis of the ore. The amount of metal, either iron or certain others, can be known in usually less than one hour after the ore material, crushed to minus 10 mesh, thus greatly simplifying the work of a prospector.

Direct reduction of iron oxide in ore to steel indicates the very great saving by this invention. Whether it is best to reduce iron oxide to solid state small particle product or to melt the small particles depends on what the iron or steel is to be used for, and whether a steel finished to specification can be made at a deposit, is a question for the user. Aluminum is melted into what is called "ingot metal." But where iron or steel must be melted it can save much to ship quite pure iron long distances or to a center not so far distant where melting is not costly.

The advantage of avoiding melting is great. The advantage of reduction of a small percentage, as little as 1% of iron, in an ore containing from 6% to 50% of iron, is a new and important advantage, for example, to recovery a nickel-iron alloy direct from the ore. Further advantage results since phosphorus can be separated from the nickel-iron alloy metal, without melting.

Separation of titanium as oxide without leaving more than 0.05% of titanium in the reduced iron opens deposits now not considered of value.

Control of carbon content in the reduced metal particle is another advantage.

To avoid carbon in the reduced metal requires avoiding use of ore material of even limestone (a carbonate). If such ore material can be had, the use of "straight hydrogen" is very important.

Use of aluminum as reducer is also very important by this invention.

The examples in this specification cover a wide range of usefulness.

In certain claims a temperature for final reduction is above the sticking and fusion temperature. This was what stopped use of the sponge iron and fluid bed processes from taking advantage of higher temperatures. It has been found that temperatures much higher than the limits for non-fusion give far better results, because reactions at above 2300° F. are much faster than at under 1900° F.

What I claim is:

1. The process of reducing iron oxide in ore material containing it, which process comprises providing a furnace chamber and means for heating charge therein to at least 2800° F.; preparing particle charge of the ore material; admitting this into the furnace chamber; subjecting it to reduction therein by reducing material in contact with the ore material particles at temperature above fusion and sticking of the ore charge particles while maintaining conditions reducing to the metal oxide desired reduced: reducing the metal oxide in the particles to dense solid state metal particles; discharging the reduced metal from the chamber and separating unreduced material.

2. The process of claim 1 in which the reduced metal is discharged in the solid state without melting it.

3. The process of claim 1 in which the reduced solid state metal particles are melted in the furnace in which they are first reduced from the oxide and formed, and then discharged in the melted state.

4. The process of claim 1 in which the ore material particles are heated and reduced at temperature above the melting temperature of the reduced metal to solid state metal particles.

5. The process of claim 1 carried out in a chamber in which loose solid state particle charge is heated and reduced to solid state metal particles and discharged.

6. The process of claim 1 in which the ore material contains an element oxide desired not reduced into the reduced metal particles; the process consisting further in providing an element oxide of different chemical nature, basic or acid, and forming an unmelted salt compound with the element oxide desired not reduced into the solid state metal particle, limiting reduction of the element desired not reduced while reducing the iron oxide to metal.

7. The process of claim 1 carried out in an arc heated furnace chamber in which the ore material particles move.

8. The process of claim 1 in which solid reducing material is used in amount to reduce the desired amount of the iron oxide in the ore charge.

9. The process of claim 1 in which solid carbonaceous reducing material is used in amount to reduce the desired amount of the metal oxide desired reduced.

10. The process of reducing metal oxide in ore material containing it, the process comprising provision of a furnace chamber in which an arc-stream is maintained in gas which is reducing to the metal oxide desired reduced, the equipment including provision of reactance in the arc current circuit to stabilize the arc, and the equipment also having means for change of voltage across the arc and for control of energy development in the arc; the process further consisting in preparing particle charge of the ore material; admitting this charge into the furnace chamber and causing the particles to pass thru the highly heated gas whereby the ore particles are heated to above 2300° F.; causing current increase in the arc and energy increase requiring lengthening the arc-stream to further limit energy development; reducing the metal oxide in the particles of the material heated to high temperature to solid state metal particles; discharging the reduced metal and other material from the furnace.

11. The process of claim 10 carried out in a furnace in which the chamber rotates about the arc stream and in which solid reducing material is provided in the charge.

12. The process of claim 10 in which the solid reducer is carbonacous reducing material, causing reduction of iron oxide and carbonizing the reduced iron.

13. The process in accordance with claim 12 in which the solid carbonaceous material is sufficient to carbonize the reduced iron whereby the reduced iron melts at much lower temperature than the melting temperature of pure iron.

14. The process of reducing iron oxide-containing material containing phosphorus oxide in amount in proportion to the iron content more than desired if all of both iron and phosphorus are reduced, the process consisting in preparing particle charge, mixing solid carbonaceous reducing material with the iron oxide-containing material of the charge in amount to incompletely reduce the total iron leaving iron oxide unreduced; also mixing in the charge lime (CaO) in amount to form a $2CaO \cdot P_2O_5$ salt compound with the phosphorus oxide; admitting this charge into a heating and reducing chamber and heating the charge to temperature above the melting temperature of the iron oxide-containing material while maintaining the gaseous atmosphere in the chamber reducing to FeO by passing gas reducing to FeO thru the chamber; reducing the iron oxide direct to steel while holding phosphorus from reduction of its compound with CaO and the unreduced iron oxide, forming dense solid state steel particles before melting them and discharging the products before melting them, and separating the low carbon iron from the unmelted phosphorus compounds.

15. The process of treating material containing iron and titanium in oxide form, the process consisting in providing particle charge of particles including solid reducing material, the latter in amount to combine with about 80% of the oxygen of the iron content of the charge; admitting the charge into a heating chamber and heating the charge therein to temperature between 2400° F. and 3000° F., reducing up to about 80% of the iron as oxide in atmosphere reducing to FeO, reducing the iron oxide to dense solid state metallic particles before melting it, and subsequently separating the reduced iron from the remaining unmelted material containing titanium and iron in oxide form, unmelted.

16. The process of reducing iron oxide from its compound with titanium oxide separated from the reduced iron by the process of claim 15, and subjecting this material to reduction by aluminum in amount to incompletely reduce the iron oxide, and then discharging the products and separating the solid state metal.

17. The process of claim 1 for selective reduction of nickel oxide in a nickel and iron oxide ore which ore contains from less than 1% of nickel up to higher percentages and which ore contains more iron than nickel, the process comprising selectively reducing nickel oxide by maintaining conditions reducing to nickel oxide by gas which is reducing to nickel oxide but not to iron oxide, forming nickel-iron alloy metal particles; discharging the nickel-iron alloy metal containing less iron in proportion to nickel than in the ore material.

References Cited

UNITED STATES PATENTS

| | | | |
|---|---|---|---|
| 2,711,952 | 6/1955 | West | 75—33 |
| 2,744,820 | 5/1956 | Kocks | 75—11 |
| 2,865,732 | 12/1958 | Jensen | 75—11 |
| 2,880,083 | 3/1959 | Wienert | 75—33 |

HYLAND BIZOT, *Primary Examiner.*

DAVID L. RECK, *Examiner.*

W. C. TOWNSEND, H. W. TARRING,
*Assistant Examiners.*